(12) United States Patent
Reiss (10) Patent No.: US 8,725,855 B2
(45) Date of Patent: May 13, 2014

(54) DEVICE COMMISSIONING AND REPLACEMENT

(75) Inventor: Wanda Reiss, Sudbury, MA (US)

(73) Assignee: Schneider Electric USA, Inc., Palatine, IL (US)

( * ) Notice: Subject to any disclaimer, the term of this patent is extended or adjusted under 35 U.S.C. 154(b) by 456 days.

(21) Appl. No.: 12/814,243

(22) Filed: Jun. 11, 2010

(65) Prior Publication Data

US 2011/0307589 A1 Dec. 15, 2011

(51) Int. Cl.
*G06F 15/173* (2006.01)

(52) U.S. Cl.
USPC ........... 709/223; 709/220; 709/226; 709/228; 370/401

(58) Field of Classification Search
USPC ......................................................... 709/223
See application file for complete search history.

(56) References Cited

U.S. PATENT DOCUMENTS

| | | | | |
|---|---|---|---|---|
| 5,446,897 | A | * | 8/1995 | Mathias et al. ............... 709/220 |
| 6,771,673 | B1 | * | 8/2004 | Baum et al. .................... 370/535 |
| 6,957,276 | B1 | * | 10/2005 | Bahl ............................ 709/245 |
| 2002/0046263 | A1 | | 4/2002 | Camerini et al. |
| 2003/0005276 | A1 | * | 1/2003 | French et al. ..................... 713/2 |
| 2003/0156579 | A1 | | 8/2003 | Cho |
| 2005/0138205 | A1 | | 6/2005 | Naismith |
| 2006/0200256 | A1 | | 9/2006 | Mason et al. |
| 2006/0208896 | A1 | | 9/2006 | Mason |

FOREIGN PATENT DOCUMENTS

| | | |
|---|---|---|
| EP | 2117169 A1 | 11/2009 |
| WO | 03079126 A1 | 9/2003 |
| WO | 2005114604 A2 | 12/2005 |

OTHER PUBLICATIONS

International Application No. PCT/US2011/039814 International Search Report dated Dec. 16, 2011.

* cited by examiner

*Primary Examiner* — Hua Fan
(74) *Attorney, Agent, or Firm* — Banner & Witcoff, Ltd.

(57) ABSTRACT

Systems and methods for associating commissioning files with components in a networked environment are provided. In one embodiment, a unique network identifier of a system component, such as a MAC address, and a network address, such as an IPv4 address may stored in an association file to link components on a network layout map to specific commissioning files. The network address may have a lease configured to infinity or to a power cycle of a component on the network. Further aspects relate to detecting if a system component has been replaced with another component. The detection may determine whether the new component has a unique network identifier not located in a association file. A user input may indicate whether the component is new or a replacement. If the new component is a replacement for another component, the unique network identifier of the first system component may be received and recorded.

18 Claims, 6 Drawing Sheets

| 402 Device Identification Code | 406 Commissioning File | 408 Unique Network Identifier | 410 Network Address | 414 Previous Network Identifier |
|---|---|---|---|---|
| DEVICE 220 | 033007.bin | CR-G1-KE-G1 | 192.168.0.003 | |
| DEVICE 220 | 033007.bin | SP-G2-KH-12 | 192.168.0.003 | CR-G1-KE-G1 |
| | | | | |

400 ↗ ; 404 →  (row 1) ; 412 → (row 2)

DEVICE COMMISSIONING AND REPLACEMENT

BACKGROUND

Networked systems are becoming increasingly ubiquitous. As one example, interconnecting multiple electronic components permits advanced control systems to control and monitor large quantities of components. The adoption of commercial and industrial networks permits individuals to share files, such as music, video, and documents across several interconnected components. While the adoption of networked systems has undoubtedly increased, existing roadblocks slow its adoption. Further, current systems for setting up or maintaining these networked systems are often tedious, inefficient, and may lead to costly errors.

During deployment of a networked system, each component needs to be properly addressed to permit reception and/or transmittal of electronic signals. Without proper addressing, a component may not properly be controlled and/or monitored. Prior art methods often require personnel to manually adjust a mechanical switch to force an assignment of a network address. This process consumes valuable resources, is prone to human error, and will not work with devices that do not have the applicable mechanical switches. Additionally, current systems have an upper threshold of supported switches that is often insufficient for many applications.

Other prior art systems utilize an addressing server to assigned fixed static address to each component. These processes also unfortunately require a user to manually access a server and manually provide the proper address to be assigned. Further, once the tedious process of assigning an address is complete, devices often need to be set up, such as with commissioning files, to allow the device to perform a certain function and/or to be properly integrated within the networked system.

Problems are further compounded when components within the networked system fail or are replaced. Not only must the component be properly addressed, but it must also be updated with commissioning files to perform an intended function. In this regard, the commissioning files may have been updated, and as such, it would be advisable to ensure the new replacement component is updated with the most recent file(s).

As technology advances, certain electronic devices in the system may become redundant. Removal of redundant components may release its address for other components that may be introduced to the network system. Likewise adding a new unrelated component may erroneously be assigned to the address of the removed component, thereby leading to incorrect or insufficient commissioning or maintenance of certain devices on the system. For example, a production line may need to be quickly converted to packaging a first product in a box to packaging a second product is a plastic canister. Improved systems and methods are desirable.

BRIEF SUMMARY

Certain aspects relate to methods, computer readable media, and apparatuses configured to readily permit accurate and efficient commissioning of new components in a networked system. In one embodiment, a commissioning file may be linked to a first device identification code that represents a first system component represented on a network layout map. The network layout map may be a topological map. Yet in other embodiments, the network layout map may be a logical map. In certain embodiments, the linking of the commissioning file may create an association entry in an association file. In accordance with further embodiments, a unique network identifier of the first system component may be received. The unique network identifier may be a media access control (MAC) address. The unique network identifier may be received through a reader operatively connected to a network, such as for example, a bar code reader or through RFID technology.

The commissioning file may be associated with a dynamic network address and/or the unique network identifier of the system component, such that the predetermined device identification code is associated with the network address. The network address may have a lease configured to infinity. In other embodiments, the lease may expire upon the termination of a power cycle of a component, including for example, the first system component, a file association server, and/or an address server that assigns the dynamic address. In certain embodiments, the address may be a dynamic Internet Protocol address, including but not limited to, an IPv4 address.

Further embodiments may compare one or more values, such as for example, within the commissioning file, against one or more values from the network layout map to determine if the first system component is positioned in accordance with the network layout map. In other embodiments, values from other fields in an association files, such as an association table, may be utilized to determine if the first system component is correctly positioned.

Further aspects of this disclosure relate to systems and methods for detecting if the first system component has been replaced with a second system component. In one embodiment, an indication that the second system component is a replacement for the first system component may be received. For example, in certain embodiments, a new component (different than the first component) may be detected. The detection may be based, at least in part, on whether the new component has a unique network identifier (i.e., a media access control address) that is not located in an association file. The detected new component may be displayed on a display device to a user as a new network resource. A first user input may be received that indicates that a user has selected a first network resource.

In certain embodiments, a user input may be received comprising information indicative of whether the first network resource is a new system component or a replacement for the first system component. If the new component is a replacement for another component, the unique network identifier of the first system component may be received and recorded. In certain embodiments, an association entry of the association file may be updated to include the unique network identifier of the new component, such that a predetermined device identification code is associated with the unique network identifier of the new network component. The association entry may also be updated to retain the unique network identifier of the network component being replaced.

Further aspects of this disclosure relate to updating commissioning files. An indication that the commissioning file has changed may result in flagging the commissioning file. As used herein, flagging a commissioning file is inclusive of all systems and methods of identifying the commissioning file, including an indication associated within the association table that identifies the component(s) associated with the updated commissioning file. Further embodiments may synchronize the flagged commissioning file with the appropriate system component(s). Synchronization may be done through one or more different processes. In one embodiment, a unique network identifier (such as a media access control address)

and/or the associated network address (IPv4 address) may be obtained from the association table and matched with the linked commissioning file for that component. The linked component(s) may then be updated using the information from the association table. These and further embodiments are discussed below.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
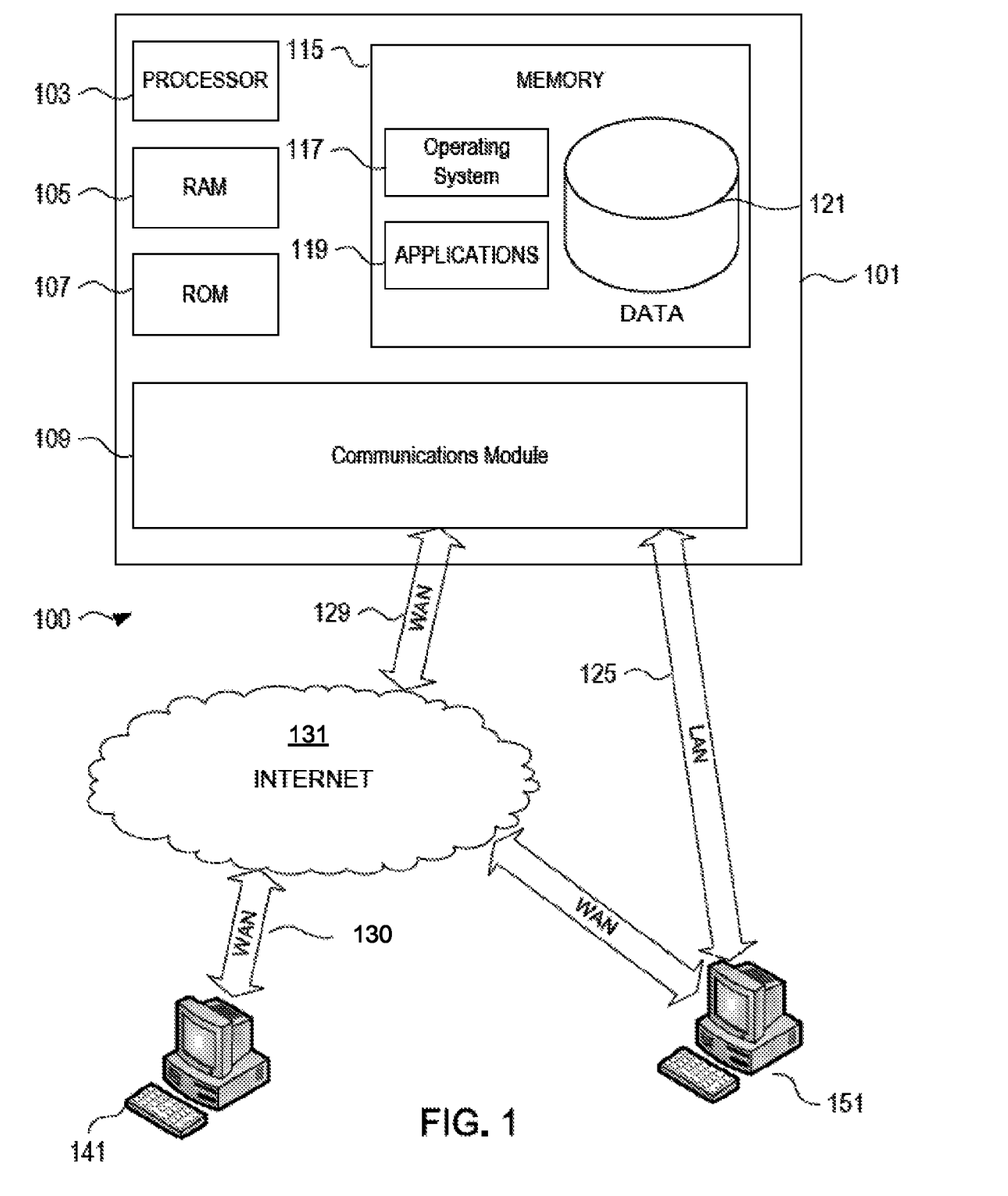
FIG. 1 shows an illustrative operating environment in which various aspects of the embodiments may be implemented.
Figure 6:
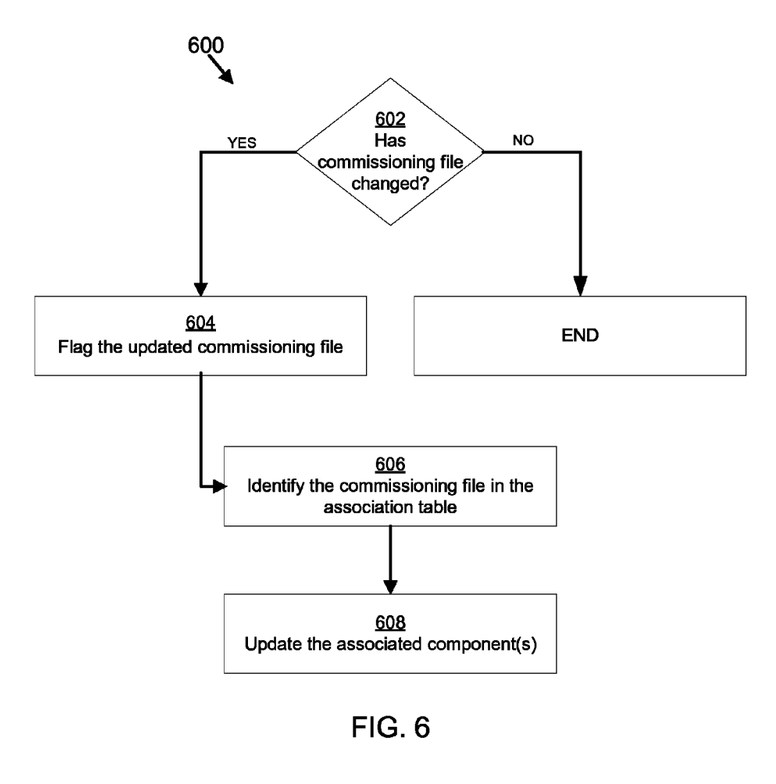
FIG. 6 shows a flow diagram of an illustrative process in accordance with one exemplary embodiment of the invention.

In accordance with various aspects of the embodiments, methods, computer-readable media, and apparatuses are disclosed that may be utilized to associate commissioning files with components in a networked environment. Other aspects relate to commission various components within networked environments. FIG. 1 illustrates an example of a suitable network environment 100 (e.g., for which may be part of illustrative system 200 (shown in FIG. 2) and/or perform one or more aspects of illustrative processes 300 and/or 600 (as shown in FIGS. 3a and 6 respectively). The computing system environment 100 is only one example of a suitable computing environment and is not intended to suggest any limitation as to the scope of use or functionality of the embodiments. Further, the computing system environment 100 should not be interpreted as having any dependency or requirement relating to any one or combination of components shown in the illustrative computing system environment 100. The embodiments are operational with numerous other general purpose or special purpose computing system environments or configurations.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user terminals 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 125 through a network interface or adapter in the communications module 109. When used in a WAN networking environment, the computing device 101 may include a modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Aspects of disclosed embodiments relate to commissioning new components in a system having a networked environment. Further aspects relate to performing maintenance on devices within the networked environment. As would be appreciated by those skilled in the art, system components often need to be commissioned before use, during maintenance, and/or when replacing other components. In certain embodiments, specific devices may need to be loaded with computer-executable instructions comprising a commissioning file. For example, commissioning files may be required to enable a specific component to function properly or perform a certain function. For example, an industrial control environment may rely on several different electronic devices to perform specific tasks. Often, multiple components require different commissioning files. For example, one commissioning file may be needed for a specific device while another commissioning file may be required for a different device. Further, if the component serving as a specific device fails, there needs to be an efficient process for ensuring the replacement component can be accurately commissioned.

Figure 2:
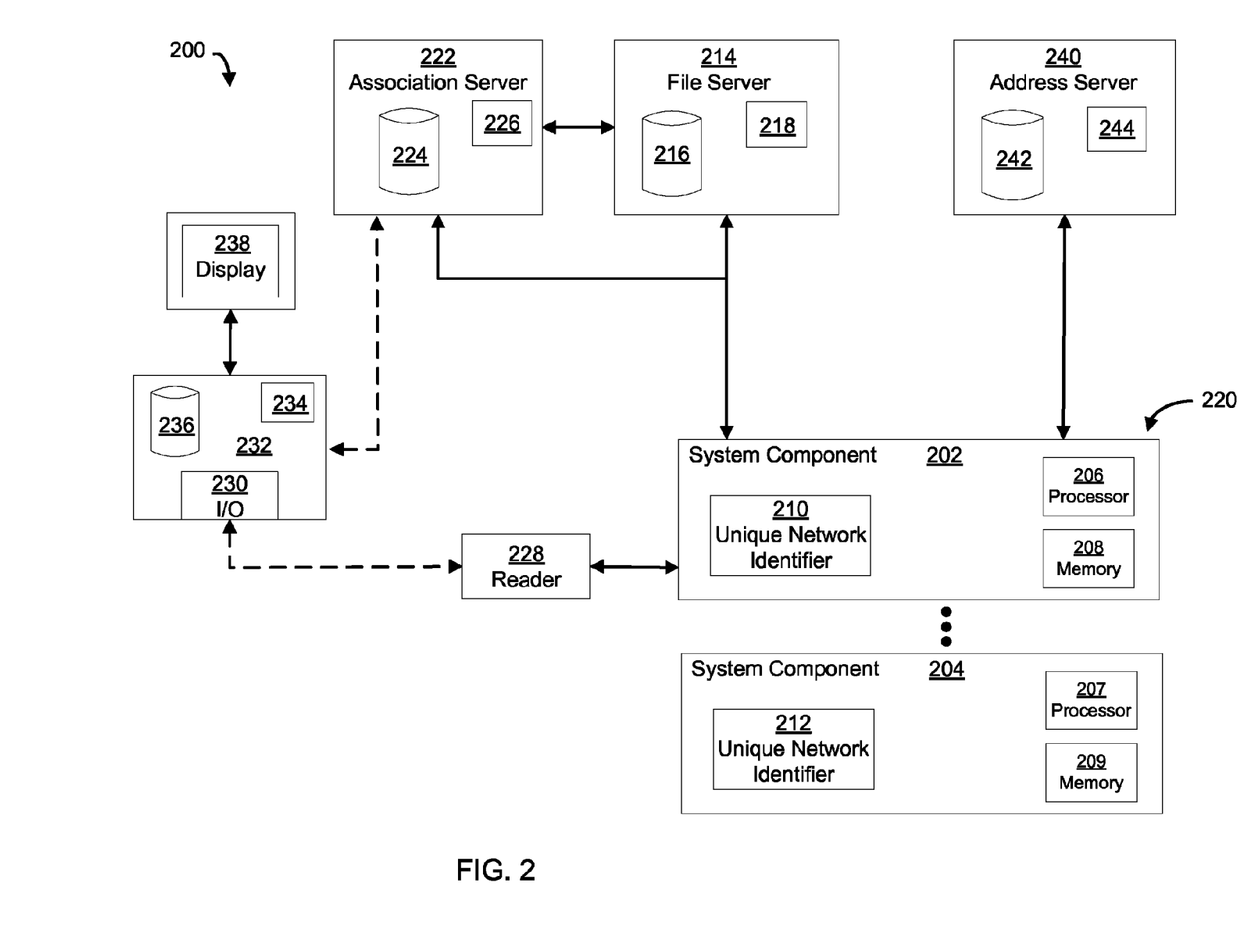
FIG. 2 is an illustrative networked system that may be used to implement the processes and functions of certain aspects of the embodiments.
Figure 3A:
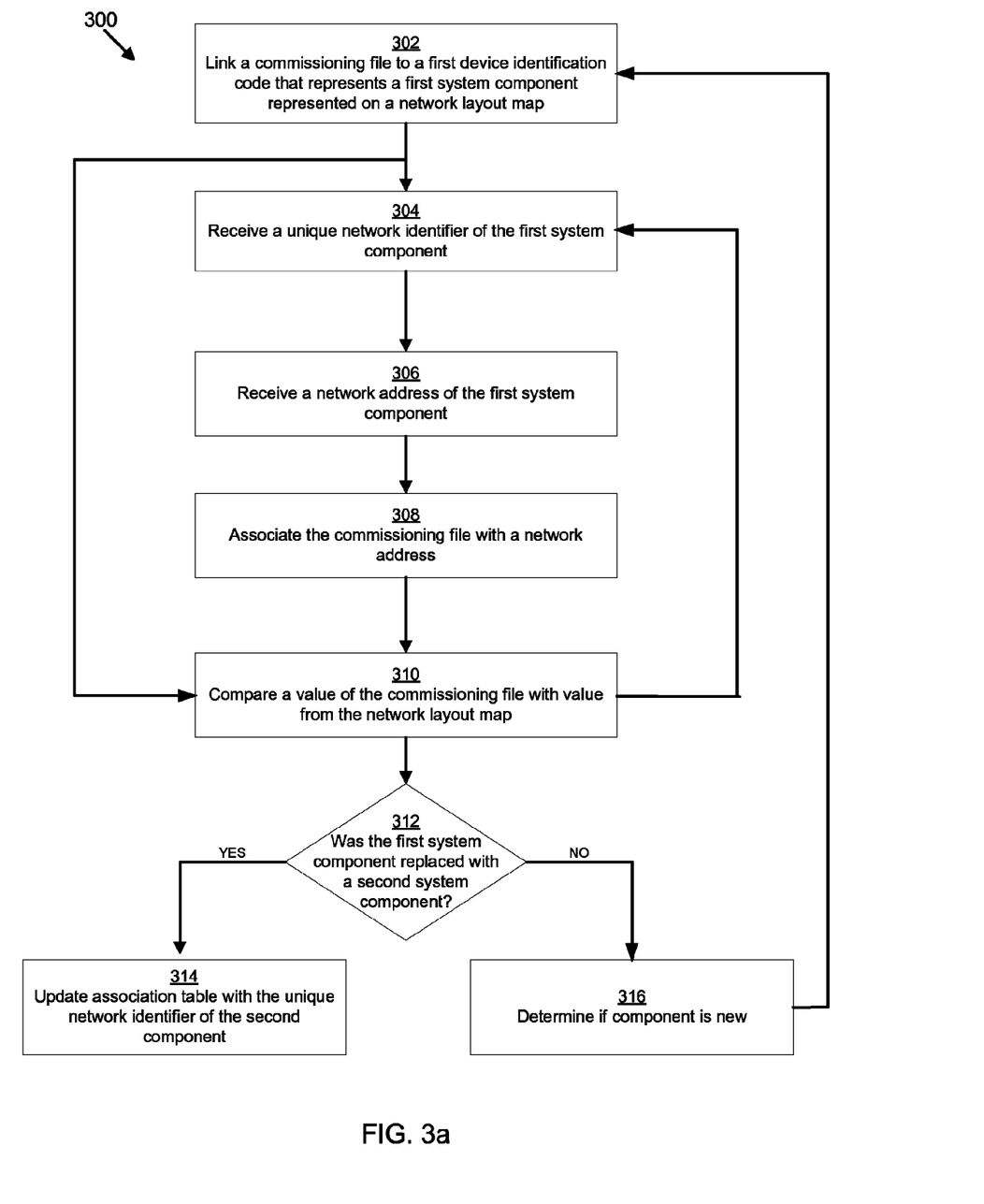
FIGS. 3a and 3b are flow diagrams of an illustrative process in accordance with exemplary embodiments of the invention.

FIG. 2 shows an exemplary networked system 200 having a plurality of system components (see, e.g. 202, 204). Components 202, 204 may be any device or portions thereof, configured to communicate over a communication network, including but not limited to a LAN, such as LAN 125 or WANs 129/130, shown in FIG. 1. System components 202, 204 may be in operative communication with each other and/or other electronic devices, such as through any wired or wireless communications protocol. In this regard, system component 202 may be remotely located from system component 204. As shown, exemplary system component 202 comprises processor 206 and memory 208 and component 204 comprises processor 207 and memory 209. Components 202, 204 may comprise a programmable logic controller (PLC), PLC module, a remote input/output module, speed controller, interface of another component, or any addressable device in a communication system.

In one embodiment, system 200 comprises an industrial control environment and system components 202 and/or 204 may be utilized in an industrial process. In other embodiments, components 202, 204 may be utilized in building automation or power distribution systems. Indeed, a person of ordinary skill in the art with the benefit of this disclosure will appreciate that components 202, 204 are not limited to specific devices within a particular field, but rather are merely exemplary components to illustrate certain features of the disclosed embodiments. In certain embodiments, system components 202 and 204 may be within a unitary housing. Thus, there is no requirement that each component 202, 204 be separate and distinct from another component. For example, system components 202, 204 may each be an independently addressable sub-system of a larger device.

As discussed below, addressability may be based upon a protocol supported by the sub-system, such as an internet protocol (IP) address. In other embodiments, a component (such as component 202) may be distinguished from another component (such as component 204) based upon a unique network identifier. In one embodiment, component 202 comprises a first communication component having a unique network identifier 210 and component 204 comprises a second communication component having a different network identifier 212. In certain embodiments, a media access control (MAC) address may be utilized as a unique network identifier 210, 212 in accordance with various aspects disclosed herein. Exemplary unique network identifiers will be discussed later in this disclosure.

Turning briefly to FIG. 3a, illustrative flowchart 300 shows one or more processes that may be used as part of various embodiments disclosed herein. In accordance with one embodiment, a commissioning file may be linked to a first device identification code that represents a first system component (see block 302). In one embodiment, the identification code identifies the first system component from a plurality of system components represented on a network layout map. In one embodiment, a network layout map may provide information relating to a topological layout, such as the positioning of a first component in relation to at least a second component of the system. In certain embodiments, a network layout map may provide information relating to a logical layout, such as providing information regarding the transmission and/or receipt of electronic signals between components within a system. For example, in certain embodiments, a network layout map may resemble the arrangement shown in FIG. 2. In certain embodiments, a network layout map may provide information relating to a topological and a logical layout of a system, such as system 200 shown in FIG. 2. The network layout map may be in either a tangible form, such as provided on a printed document, or alternatively, may be stored on a memory and rendered on an electronic display device.

In certain embodiments, commissioning files may be stored in one or more repositories. For example, commissioning file server 214 shown in exemplary system 200 of FIG. 2, comprises memory 216 and processor 218. In one embodiment, commissioning files may be stored within memory 216 and read and or manipulated with computer-executable instructions executed by processor 218. As understood by those skilled in the art, memory 216 may comprise one or more computer-readable mediums configured to store a plurality of commissioning files. In certain embodiments, memory 216 comprises computer-executable instructions, that when executed by a processor (such as processor 218), may receive an updated commissioning file. In one embodiment, commissioning file server 214 may receive electronic signals configured to check for updates relating to at least one commissioning file stored on memory 216.

Returning to the device identification code, certain network layout maps may refer to specific devices by a specific code, referred herein as a device identification code. For example, if FIG. 2 was a network layout map, electronic device position 220 is shown as occupied (or configured to be occupied) by system component 202. In this regard, if system component fails or otherwise is replaced, another component would occupy the electronic device position 220. The replacement of components is discussed in more detail later in this document. The device identification code may be any identifier, including an identifier comprising alphanumeric characters, a link to another document or file, or any reference that may be used, either directly or indirectly, to relate to a specific device in a networked environment.

Electronic device position 220 may be associated through the use of an association entry in an association file that links the device identification code with a component within an electronic device position 220. Exemplary apparatuses that may be utilized are shown in system 200 of FIG. 2. For example, system 200 may include a file association server, such as file association server 222 comprising memory 224 and processor 226. While exemplary file association server 222 is shown as being separate and distinct from commissioning file server 214, there is no requirement that the commissioning file server 214 be separate from file association server 222. In this regard, processor 226 may comprise processor 218 and memory 224 may comprise at least a portion of memory 216.

In certain embodiments, memory 224 of association server 222 may comprise an association table. In one embodiment, the association table may link a system component 202, 204 with a commissioning file stored at the commissioning file server 214. In one embodiment, association server may be temporarily (or permanently) in operative communication with an interface of a computing device, such as computing device 232 (discussed in more detail below) to update one or more files, such as stored in an association table or other logical collection of data.

Figure 4:
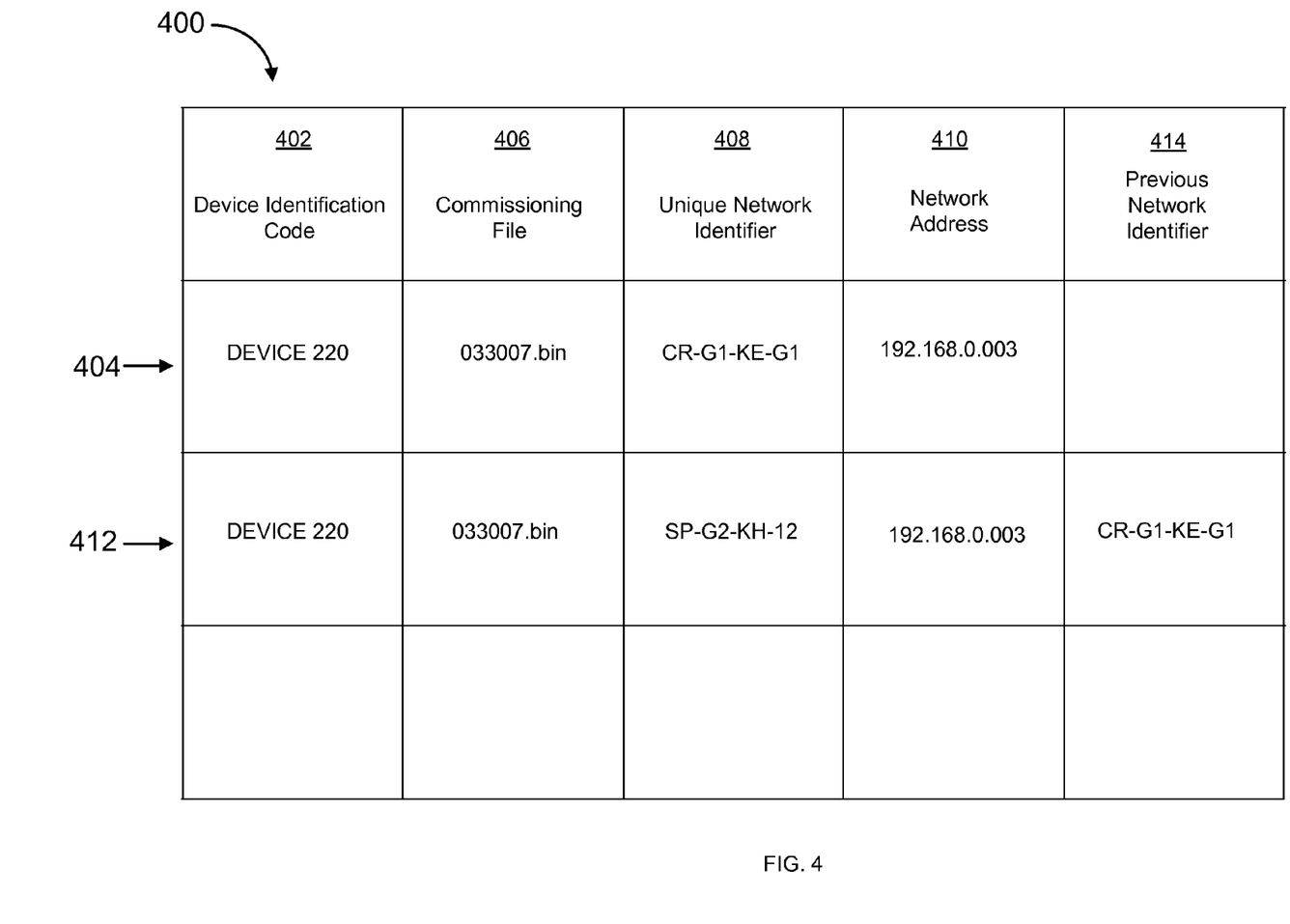
FIG. 4 is an illustrative association table that may be used in accordance with certain exemplary embodiments.

FIG. 4 shows an exemplary association table 400 that may be utilized in conjunction with various embodiments disclosed herein. Those skilled in the art will readily appreciate that the layout and format of association table 400 is merely for illustrative purposes to demonstrate features of certain embodiments, and that other organizational structures and formats are within the scope of this disclosure. As seen in FIG. 4, association table 400 may be configured to contain a device identifier (see, e.g., column 402 comprising the device identification code). In certain embodiments, a device identification code (see entry 404 for "DEVICE 220") may be correlated to a specific device on a network layout map (see, e.g. FIG. 2). Column 406 of association table 400 includes the "commissioning file." Specifically regarding entry 404, DEVICE 220 is associated with commissioning file "033007.bin." While the exemplary commissioning file is shown as an *.xxx file, those skilled in the art will readily appreciate that any number of files types may be utilized without departing from the scope of the invention. In certain embodiments, a folder or collection of folders may comprise one or more files. In one embodiment, a folder (or other collection of files) may include several files with different extensions, such as for example, *.prm and/or *.bin files. In one embodiment, two or more files may be grouped zipped folder (for example, a file having a *.z or *.zip extension), however, any other logical collection may be used without departing from the scope of the invention.

Certain embodiments may correlate the device identification code with a unique network identifier of the component. In certain embodiments, block 304 may be implemented to receive a unique network identifier. In certain embodiments, a media access control (MAC) address may be utilized as a unique network identifier. Exemplary MAC addresses include, but are not limited to, addresses created in accordance with IEE 802 and/or addresses using naming spacing in accordance with MAC-48, EUI-48 and/or EUI-64. Further, under the IPv6 protocol, network addresses may be derived from a MAC address of a system component 202. In this regard, to the extent that a portion of an IPv6 address may be utilized to provide a unique network identifier, such portions may be used in the utilization of a unique network identifier in accordance with the embodiments disclosed herein.

Figure 5:
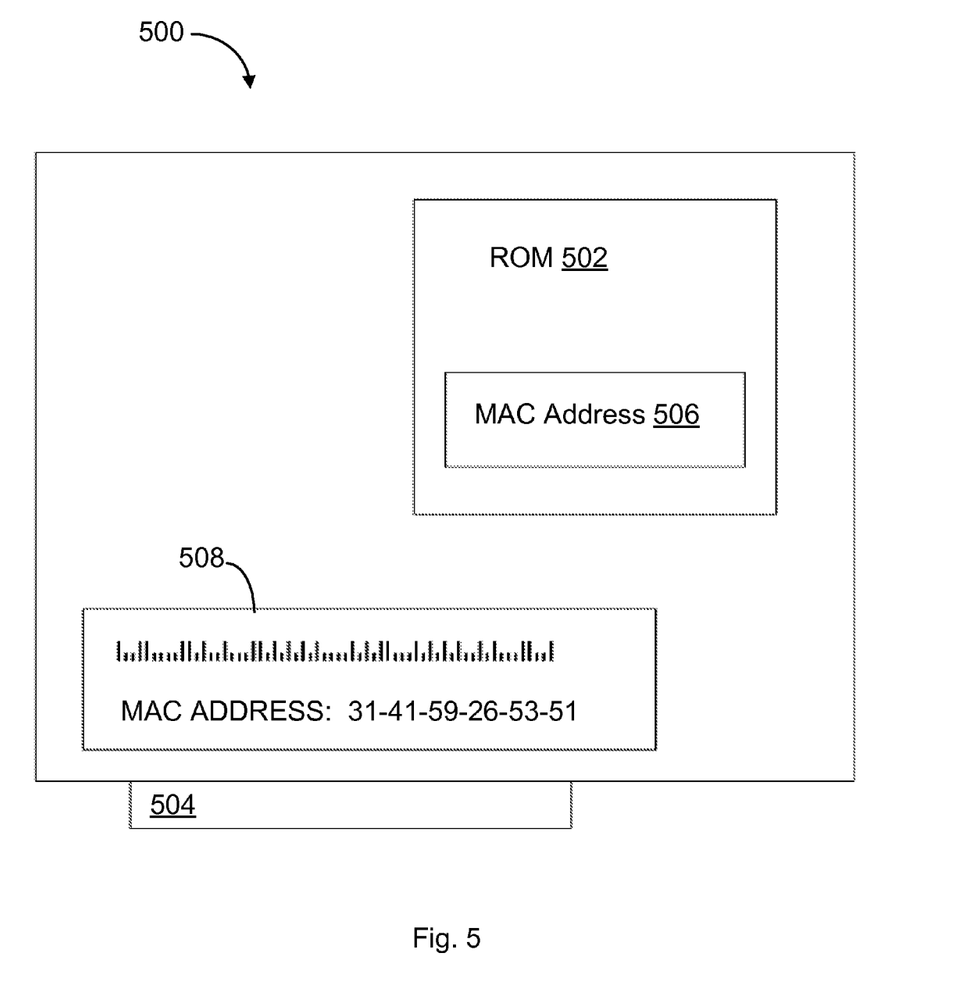
FIG. 5 is an illustrative system component that may be used in accordance with certain exemplary embodiments.

The receipt of the unique network identifier may be performed by one or more processes (see e.g., block 306 of FIG. 3). In one embodiment, the unique network identifier may be obtained directly from values stored in a memory of the system component 202/204. For example, FIG. 5 shows an exemplary system component 500 having memory 502 and input/output (I/O) 504. In one embodiment, system component 500 may comprise system component 202 and/or 204. The exemplary I/O 504 of system component 500 may be a PCI or PCI-E interface to enable the component to be inserted into another computing device. Those skilled in the art with the benefit of this disclosure will appreciate that any interface may be used to permit component 500 to communicate with one or more other components (such as components 202, 204) or other devices, such as servers 214, 222 within system 200. For example, component 500 may be a permanent imbedded portion of a component, such as components 202 or 204). In other embodiments, component 500 may be externally attached to computing devices, such as through a serial interface, such as by using a universal serial bus (USB) interface.

Memory 502 of system component 500 may be a Read-Only memory (ROM) that contains a unique network identifier (i.e., MAC address 506) of the component 500. In certain embodiments, the MAC address or another unique network identifier may be provided on a physical human or machine-readable medium. In one embodiment, the unique network identifier may be provided or reproduced on an outer surface of the component 500, such as indicia 508. In one embodiment, indicia 508 may comprise a bar code. Exemplary systems and methods of using bar codes are described in U.S. patent application Ser. No. 10/707,482, which is incorporated by reference herein in its entirety for any and all purposes. In other embodiments, radio frequency identification (RFID) systems and methods may be implemented to receive the unique network identifier from a component, such as component 500. Exemplary RFID systems and methods are described in U.S. patent application Ser. No. 11/072,816, which is incorporated herein by reference in its entirety for any and all purposes.

Regardless of what technology systems (i.e., bar codes, RFID) may be utilized to obtain the unique network identifier, system 200 may comprise a reader, such as reader 228, configured to read or otherwise receive the unique network identifier 210, 508 from a system component 202, 204, 500. Reader 228 may be operatively connected to I/O 230 of computing device 232. Computing device 232 may be any electronic device having a processor 234 and a memory 236. Computing device 232 may further comprise a display device, such as display 238. In one embodiment, computing device 232 may comprise a portable device, such as a laptop, netbook, and/or a handheld computing device, such as a mobile terminal device. In one embodiment, the memory 236 comprises a Windows-based operating system, such as Windows 7, commercially available from Microsoft (Redmond, Wash.) including CET (Customer Engineering Tools).

In certain embodiments, CET tools and/or other computer-executable instructions may allow for the automatic completion of one or more values within association table 400. In this regard, aspects of the invention relate to associating the unique network identifier with the device identification code. Looking to the exemplary association table 400 of FIG. 4 for example, column 408 shows that the unique network identifier "CR-G1-KE-G1" is associated with "DEVICE220" for entry 404.

In one embodiment, receipt of the unique network identifier by reader 228 may be transmitted to the file association server 222. The received unique network identifier read by reader 228 may be populated in column 408 of association table 400. In one embodiment, a user may select an applicable entry, such as entry 404 of association table 400 that corresponds with a specific device identification code. In one embodiment, the selection may be performed by retrieving information from a network layout map.

The commissioning file may be associated with a network address (see, i.e., block 308). In one embodiment, the network address comprises an IP address or equivalents thereof. In one embodiment, the IP address is based upon the communication protocol corresponding to the network layer of the known Open Systems Interconnection (OSI) model. Under the OSI model, each node is given a unique address. In this regard, each of the system components 202 and 204 would have a different address. Further, it is to be understood that the IP address may be implemented under the OSI model in conjunction with other protocols, such as for example, the Transmission Control Protocol (TCP) and/or the User Datagram Protocol (UDP). In one embodiment, an IP address may comprise an IPv4 address. The IPv4 address or another address may be assigned by a DHCP (Dynamic Host Configuration Protocol) server. Address server 240 having memory 242 and processor 244 may be utilized as a DHCP server in accordance with embodiments described herein.

In certain embodiments, address server 240 may assign a dynamic address. In certain embodiments, the dynamic address may be leased to the specific component (i.e., 202) for "infinity." Those skilled in the art will appreciate that a lease set to infinity will generally not expire during the normal operating parameters of the system 200. In other embodiments, the lease is configured not to expire until the at least a power cycle of the component 202 or the address server 240. Thus, interrupting power supply to the component, such as by resetting it, may result in termination of the lease. However, certain embodiments disclosed herein are configured such that the lease will not expire upon termination of one or more power cycles of various devices within a system, such as system 200. Unlike static addresses, dynamic addresses do not require a user to manually input the address that a device will be assigned to by the server. The network address received from address server 410 may be populated in association table 400. For example, column 410 for entry 404 indicates that "DEVICE 220" has been assigned network address "192.168.0.003."

Turning briefly to FIG. 3*a*, block 310 may be implemented to determine if a system component (such as 202 or 204) is positioned in accordance with the applicable network layout map. In one embodiment, one or more values within the association table may be utilized to determine whether the position is correct. In certain embodiments, values within the commissioning file column 406 and/or device identification code column 402 may comprise a descriptive name describing a device and/or its position in the network. In certain embodiments, block 310 may be performed prior to block 304.

Figure 3B:
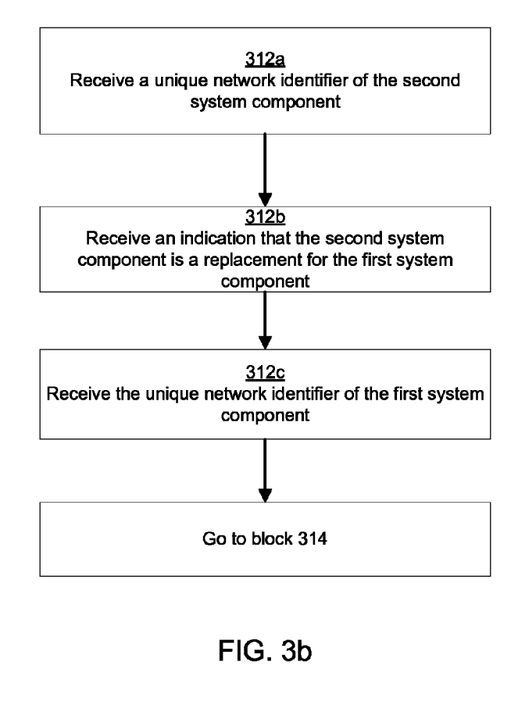

Further aspects of this disclosure relate to detecting whether a first component, such as component 202 at location 220 has been replaced with a second component (block 312 of FIG. 3*a*). FIG. 3*b* shows an exemplary flowchart that may be utilized in accordance with certain embodiments to detect whether a first component has been replaced with a second component. Looking to FIG. 3*b*, block 312*a* may receive a unique network identifier of a new (the second) component. In certain embodiments, a system component (such as component 202) may be configured to discover an address (such as a network address assigned by address server 240) of the file commissioning server 214 and the file association server 222. In certain implementations, Web Services Dynamic Discovery (WS-Discovery) may be utilized. In one embodiment, upon placement of a new component within system 200, a unique network identifier of the new system component may be received. One or more devices in system 200 may recognize the new component. For example, if computing device 232 comprises Windows 7 operating system, selecting the network explorer may provide an output, such as on display 238 indicative that the new system resource (i.e. a device) has been detected.

Upon selecting a graphical representation of the new component, such as through a user input device, computer-executable instructions may be executed, such as by processor 234 to cause a browser, such as an internet browser, to be directed towards a "web page" for the new component. In certain embodiments, the web page is imbedded within the applicable component, such as component 202. The computer-executable instructions relating to one or more web pages may be soted on a memory on the applicable component. Those skilled in the art with the benefit of this disclosure will readily appreciate that any selection of a system resource is within the scope of this disclosure and that a browser is not required. The web page (or any other mechanism) may request a user input, such as require receipt of a user input selecting whether the new component is a replacement for another component on the system 200. The specific operation, such as what information may be displayed to the user may depend on whether an indication has been received that the network resource has a media access control address that is not located in the association file.

At block 312*b*, an indication that the second system component is a replacement for the first system component may be received. In one embodiment, the user input may comprise the unique network identifier (i.e. the MAC address) of the removed component (see block 312*c*). This may allow the exact entry (i.e., entry 404) within an association table 400 to be identified. In another embodiment, the user input may comprise information relating to or inclusive of the device identification code, such as information available from a network layout map of system 200. In response, an association entry (i.e. 404) of the association file may be updated with the unique network identifier of the newly-discovered component (block 314). For example, in one embodiment, the device identification code (i.e. the value within column 402) is associated with the unique network identifier (see column 408) of the newly-discovered network component. In certain embodiments, the entry within the association table 400 may be updated and/or overwritten. For example, entry 404 may be amended or replaced with the information provided within entry 412. Looking to entry 412, the device identification code (column 402) is the same. This is because the newly-discovered component is replacing the prior component for a specific device location (i.e., position 220) within the system.

Likewise, the link to the corresponding commissioning file may remain the same, as the new device may need to be commissioned by the same file (which could have been updated since commissioning the first component, however, is still the same linking file). The network address assigned by the address server 240 may also remain unchanged. For example, as discussed above, in certain embodiments the lease has been set to infinity or otherwise not to expire until a power cycle. In other embodiments, power cycling one or more components may not release the lease to the specific component. Having the same address may be advantageous because the system 200 may function without assigning a new address to the replacement component. In certain embodiments, column 414 may be populated with information regarding the unique network identifier of the first component that was replaced by the newly-discovered component. This may be useful, for example, to provide backwards capabilities with outdated information or to provide a secondary check to ensure correct identification of components.

Alternatively, if the user input indicates that the new component is not a replacement but rather a new and different component on the system 200, then an association entry (such as 404) may be created at the association server 222. In this regard, one or more of the previous process may be implemented, such as process 302 and any previously discussed operations.

Further aspects relate to the removal of system components from a system, such as system 200. In one embodiment, the determination may occur before, during or after any process shown in FIG. 3 or disclosed throughout this disclosure. In one embodiment, the determination of whether a component has been removed may occur as part of block 312. In one embodiment a user input (such as using CET tools or other computer-executable instructions) on computing device 232 may be utilized to remove an entry from association table 400. Computing device 232 may discover the association server 222 and the address server 240. An entry within the association table 400 relating to the removed component may be flagged and/or deleted. Other entries may also be flagged. For example, other component's commissioning files may be affected by the removal of other components.

Further, electronic signals may be received at the address server 240 requesting that the corresponding network address (i.e., the address located within column 410) be freed to allow that network address to be reassigned to other components. Alternatively, if the user input indicates that the new component is not a replacement but rather a new and different component on the system 200, then an association entry (such as 404) may be created at the association server 222. In this regard, one or more of the previous process may be implemented, such as process 302 and any previously discussed operations.

Further aspects relate to receiving an indication that a commissioning file has changed. FIG. 6 is a flowchart 600 of an exemplary method according to one embodiment of the invention. Block 602 may be implemented to determine if a commissioning file stored in commissioning file server 214 has changed. If at block 602, it is determined that a commissioning file has changed, it may be flagged (block 604). In certain embodiments, an entry in association table 400 corresponding to the commissioning file may be flagged. Using the information within the entry of the association table 400, including the unique network identifier and the network address, the appropriate system component (i.e., 202, 204) may be updated with the flagged commissioning file (block 604). For example, in one embodiment, information from the association table 400 may be used to identify the appropriate component(s), such as through block 606.

In one embodiment, block 606 may be implemented to obtain a MAC address of the first system component. As shown in association table 400, a MAC address may be stored in a field for a unique network identifier (such as column 408). As shown in entry 404 for example, the MAC address is associated with an address (column 410). Therefore, in one embodiment, block 606 may be implemented to match the MAC address of the relevant system component and the corresponding IP address with the linked commissioning file. Block 608 may update the relevant system component with data from the commissioning file.

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

I claim:

1. A computer-implemented method in a networked control system comprising:
    linking a commissioning file in a commissioning file server of the network control system to a first device identification code that represents a first system component by creating an association entry in an association file in an association file server, wherein the identification code identifies the first system component from a plurality of system components represented on a network layout map;
    receiving a unique network identifier of the first system component that comprises a media access control address;
    modifying, using a processor in the association file server, the association entry of the first system component in the association file to include associations between the commissioning file of the first system component, a dynamic network address of the first system component comprising a dynamic Internet Protocol address having a lease configured to infinity, and the unique network identifier of the first system component, such that the predetermined device identification code is associated with the network address; and
    comparing one or more values within the commissioning file against one or more values from the network layout map to determine if the first system component is positioned in accordance with the network layout map.

2. The computer-implemented method of claim 1, wherein the unique network identifier comprises an Internet Protocol address derived from a media access control address.

3. The computer-implemented method of claim 1, further comprising:
   detecting that the first system component has been replaced with a second system component, wherein the detection comprises:
      receiving a unique network identifier of the second system component;
      receiving the unique network identifier of the first system component; and
      receiving an indication that the second system component is a replacement for the first system component; and
   updating the association entry of the association file with the unique network identifier of the second component, such that the predetermined device identification code is associated with the unique network identifier of the second network component and the unique network identifier of the first network component.

4. The computer-implemented method of claim 3, wherein the reception of the indication that the second system component is a replacement for the first system component comprises:
   receiving a first user input from an electronic device operatively connected to the networked control system indicative that a user has selected a first network resource;
   receiving an indication that the first network resource has a media access control address that is not located in the association file; and
   receiving a second user input comprising information indicative whether the first network resource is a new system component or a replacement for the first system component.

5. The computer-implemented method of claim 1, further comprising:
   receiving an indication that the commissioning file has changed, and in response, flagging the commissioning file.

6. The computer-implemented method of claim 5, further comprising:
   synchronizing the flagged commissioning file with the first system component.

7. The computer-implemented method of claim 6, wherein the synchronizing of the flagged commissioning file comprises:
   obtaining the media access control address of the first system component;
   matching the media access control address and the Internet Protocol address with the linked commissioning file; and
   updating the first system component with data from the commissioning file.

8. An association file server comprising:
   a processor,
   one or more non-transitory computer-readable mediums comprising computer-executable instructions that when executed by the processor are configured to perform:
   receiving a first device identification code that represents a first system component;
   linking a commissioning file to the first identification code to create an association entry in an association file, wherein the identification code identifies the first system component from a plurality of system components represented on a network layout map;
   receiving a unique network identifier of the first system component;
   associating the commissioning file with a dynamic network address assigned to the first system component and the unique network identifier of the first system component, such that the predetermined device identification code is associated with the network address
   detecting that the first system component has been replaced with a second system component, wherein the detection comprises:
      receiving a unique network identifier of the second system component;
      receiving the unique network identifier of the first system component; and
      receiving an indication that the second system component is a replacement for the first system component, wherein the reception of the indication that the second system component is a replacement for the first system component comprises:
         receiving an indication that a first user input from an electronic device operatively connected to association file server was received, the user input being indicative that a user has selected a first network resource;
         receiving an indication that the first network resource has a media access control address that is not located in the association file; and
         receiving a second user input comprising information indicative whether the first network resource is a new system component or a replacement for the first system component; and
   updating the association entry of the association file with the unique network identifier of the second component, such that the predetermined device identification code is associated with the unique network identifier of the second network component and the unique network identifier of the first network component.

9. The association file server of claim 8, wherein the association file server associates the commissioning file with a dynamic network address having a lease configured to infinity.

10. The association file server of claim 8, wherein the association file server associates the commissioning file with a dynamic network address having a lease configured not to expire for at least a power cycle of the first system component.

11. The association file server of claim 8, wherein the association file server associates the commissioning file with a dynamic network address having a lease configured not to expire for at least a power cycle of a system component that is not the first system component.

12. The association file server of claim 8, wherein the unique network identifier associated with the commissioning file comprises a media access control address and the dynamic network address comprises a dynamic Internet Protocol address.

13. The association file server of claim 8, wherein the unique network identifier associated with the commissioning file comprises a media access control address or an Internet Protocol address derived from a media access control address and the dynamic network address comprises a dynamic Internet Protocol address.

14. A non-transitory computer-readable medium comprising computer-executable instructions, that when executed by a processor, are configured to perform at least:
   linking a commissioning file in a commissioning file server of the network control system to a first device identification code that represents a first system component by creating an association entry in an association file in an association file server, wherein the identification code identifies the first system component from a plurality of system components represented on a network layout map;

receiving a unique network identifier of the first system component that comprises a media access control address;

modifying, using a processor in the association file server, the association entry of the first system component in the association file to include associations between the commissioning file of the first system component, a dynamic network address of the first system component comprising a dynamic Internet Protocol address having a lease configured to infinity, and the unique network identifier of the first system component, such that the predetermined device identification code is associated with the network address; a detecting that the first system component has been replaced with a second system component, wherein the detection comprises:
  receiving a unique network identifier of the second system component;
  receiving the unique network identifier of the first system component; and
  receiving an indication that the second system component is a replacement for the first system component; and updating the association entry of the association file with the unique network identifier of the second component, such that the predetermined device identification code is associated with the unique network identifier of the second network component and the unique network identifier of the first network component, wherein the reception of the indication that the second system component is a replacement for the first system component comprises:

receiving a first user input from an electronic device operatively connected to the networked control system indicative that a user has selected a first network resource;
  receiving an indication that the first network resource has a media access control address that is not located in the association file; and
  receiving a second user input comprising information indicative whether the first network resource is a new system component or a replacement for the first system component.

15. The computer-readable medium of claim 14, wherein the unique network identifier comprises an Internet Protocol address derived from a media access control address.

16. The computer-readable medium of claim 14, wherein the medium further comprises computer-executable instructions, that when executed by a processor, are configured to perform at least:
  receiving an indication that the commissioning file has changed, and in response, flagging the commissioning file.

17. The computer-readable medium of claim 16, wherein the medium further comprises computer-executable instructions, that when executed by a processor, are configured to perform at least:
  synchronizing the flagged commissioning file with the first system component.

18. The computer-readable medium of claim 14, wherein the medium further comprises computer-executable instructions, that when executed by a processor, are configured to perform at least:
  obtaining the media access control address of the first system component;
  matching the media access control address and the Internet Protocol address with the linked commissioning file; and
  updating the first system component with data from the commissioning file.

* * * * *